United States Patent
Wannerskog et al.

(10) Patent No.: US 11,401,359 B2
(45) Date of Patent: Aug. 2, 2022

(54) CABLE JACKET

(71) Applicant: Borealis AG, Vienna (AT)

(72) Inventors: Åsa Wannerskog, Stenungsund (SE); Ola Fagrell, Stenungsund (SE)

(73) Assignee: BOREALIS AG, Vienna (AT)

( * ) Notice: Subject to any disclaimer, the term of this patent is extended or adjusted under 35 U.S.C. 154(b) by 120 days.

(21) Appl. No.: 16/770,218

(22) PCT Filed: Dec. 28, 2018

(86) PCT No.: PCT/EP2018/000589
§ 371 (c)(1),
(2) Date: Jun. 5, 2020

(87) PCT Pub. No.: WO2019/129380
PCT Pub. Date: Jul. 4, 2019

(65) Prior Publication Data
US 2021/0163641 A1    Jun. 3, 2021

(30) Foreign Application Priority Data
Dec. 28, 2017   (EP) .................................... 17211007

(51) Int. Cl.
*C08F 210/06* (2006.01)
*H01B 3/44* (2006.01)
*H01B 9/00* (2006.01)

(52) U.S. Cl.
CPC ........... *C08F 210/06* (2013.01); *H01B 3/441* (2013.01); *H01B 9/00* (2013.01)

(58) Field of Classification Search
CPC .......... C08F 210/06; H01B 3/441; H01B 9/00
See application file for complete search history.

(56) References Cited

U.S. PATENT DOCUMENTS

| 6,342,564 B1 | 1/2002 | Pitkaenen |
| 2013/0161059 A1 | 6/2013 | Steffl |

FOREIGN PATENT DOCUMENTS

| EP | 2072576 | 6/2009 |
| WO | WO 2011/050963 | 5/2011 |
| WO | WO 2016/162359 | 10/2016 |

OTHER PUBLICATIONS

International Search Report for corresponding PCT Application No. PCT/EP2018/000589 dated Mar. 20, 2019.

*Primary Examiner* — Catherine S Branch
(74) *Attorney, Agent, or Firm* — Fay Sharpe LLP

(57) ABSTRACT

The present invention relates to a cable jacket comprising a random heterophasic propylene copolymer, the random heterophasic polypropylene copolymer comprising a matrix (M) being a random propylene copolymer (R-PP) and dispersed therein an elastomeric propylene copolymer (E), wherein the random propylene copolymer (R-PP) comprises a first propylene copolymer fraction (R-PP1) having a comonomer content in the range of 0.8 to 6.0 mol % and a second propylene copolymer fraction (R-PP2) having a comonomer content in the range of 7.2 to 20.0 mol %, based on the overall amount of fractions (R-PP1) and (R-PP2), and wherein the random heterophasic propylene copolymer has MFR2 (230° C.) measured according to ISO 1133 in the range of 0.5 to 15 g/10 min, and Charpy impact strength measured according to ISO 179-1/1eA at −20° C. in the range of 5 to 20 kJ/m$^2$. The present invention further relates to a power cable comprising the cable jacket.

15 Claims, No Drawings

CABLE JACKET

This is a 371 of PCT/EP2018/000589, filed Dec. 28, 2018, which claims priority to European Patent Application No. 17211007.4, filed Dec. 28, 2017, the contents of which are fully incorporated herein by reference.

FIELD OF INVENTION

The present invention relates to a cable jacket comprising a random heterophasic propylene copolymer. Further, the invention relates to a power cable comprising the jacket.

BACKGROUND

Cables, which include power cables for high, medium or low voltage, generally comprise a core of one or more power transmission media surrounded by a sheath consisting of one or more layers. The outermost layer is referred to as jacket or jacketing layer and is nowadays made of polymer material, such as polyethylene or polyvinylchloride.

Copper wires are often used as concentric neutrals in power cables. Their role is to transport fault currents and charging currents, and to ensure that the outer semiconductor is kept at ground potential. Copper is very expensive compared to the plastic components in the cable, and a possible reduction in the amount of copper has significant impact on the total cost of a cable. Further, possible reduction or elimination of copper concentric neutrals increases the screen resistance, which in turn reduces the circulating current and lowers the temperature of the cable, thus increasing lifetime of the cable as the degradation of cable plastics accelerates with increased temperature.

A jacket material having good mechanical properties at high temperatures will make it possible to decrease the copper screen threads in a power cable.

One possible material that fulfils the above-mentioned requirements is cross-linked polyethylene (Temple, W. S, 2010, Crosslinked Polyethylene Jackets for Medium Voltage Cables. Presentation held the Fall 2010 IEEE PES ICC meeting, Fountain Hills, Ariz., USA).

An alternative solution is to use polypropylene (PP) which has a higher melting point than conventional polyethylene (PE) jacketing material. Any standard PP material would provide improved high temperature mechanical properties compared to PE. However, using a standard PP would not be suitable for cable jacketing, since this material has poor mechanical impact properties at temperatures below zero degrees Celsius.

Therefore, there is still the need to provide a cable jacket having a combination of high impact strength at temperatures below zero degrees Celsius, while featuring good mechanical properties at elevated temperature. This would allow reducing the amount of copper screen threads needed in a power cable thus ultimately decreasing the costs and increasing lifetime of the cable.

DESCRIPTION OF THE INVENTION

The present invention provides a cable jacket comprising a random heterophasic propylene copolymer, wherein the propylene copolymer has $MFR_2$ (230° C.) in the range of 0.5 to 15 g/10 min, and Charpy impact strength at −20° C. in the range of 5 to 20 $kJ/m^2$.

The random heterophasic propylene copolymer according to the present invention is thermoplastic which means that it is easy to recycle at the end of the life-time of the cable. Further, it also allows for re-processing of production scrap. Other advantages of the random heterophasic propylene copolymer are lower shrinkage and increased flexibility.

Using the random heterophasic propylene copolymer according to the present invention allows reducing or even eliminating the copper screen material, and also eliminates the need for a cross-linking step, thus simplifying the manufacturing process compared to using a crosslinked polyethylene.

The heterophasic propylene copolymer (RAHECO) according to this invention may comprise a matrix (M) being a random propylene copolymer (R-PP) and dispersed therein an elastomeric propylene copolymer (E). Thus, the matrix (M) contains (finely) dispersed inclusions not being part of the matrix (M), wherein the inclusions contain the elastomeric propylene copolymer (E). The term "inclusion" indicates that the matrix (M) and the elastomeric propylene copolymer (E) form different phases within the heterophasic propylene copolymer (RAHECO). The presence of inclusions may for instance be visible by high resolution microscopy, like electron microscopy or atomic force microscopy, or by dynamic mechanical thermal analysis (DMTA). Specifically, when using DMTA, the presence of a multiphase structure can be identified by the presence of at least two distinct glass transition temperatures.

Preferably, the heterophasic propylene copolymer (RAHECO) according to this invention comprises the random propylene copolymer (R-PP) and the elastomeric propylene copolymer (E) as the only polymer components. Further, the heterophasic propylene copolymer (RAHECO) may comprise other polymers in an amount not exceeding 5.0 wt %, more preferably not exceeding 3.0 wt %, most preferably below 1.0 wt %, based on the total amount of heterophasic propylene copolymer (RAHECO). An example of a polymer which may be present in such low amounts is polyethylene which is a reaction by-product formed during preparation of the heterophasic propylene copolymer (RAHECO).

Typically, the heterophasic propylene copolymer (RAHECO) has rather low crystallization temperature, i.e. of not more than 125° C., more preferably in the range of 105 to 125° C., still more preferably in the range of 108 to 120° C.

The heterophasic propylene copolymer (RAHECO) further comprises comonomers apart from propylene. Suitable comonomers may be ethylene and/or C4 to C8 α-olefins. Accordingly, the term "propylene copolymer" according to this invention is understood as a polypropylene comprising, preferably consisting of, units derivable from (a) propylene
and
(b) ethylene and/or $C_4$ to $C_8$ α-olefins.

Thus, the heterophasic propylene copolymer (RAHECO), i.e. the random propylene copolymer (R-PP) as well as the elastomeric propylene copolymer (E), comprises monomers copolymerizable with propylene, for example comonomers such as ethylene and/or $C_4$ to $C_8$ α-olefins. Suitable $C_4$ to $C_8$ α-olefins may be 1-butene and/or 1-hexene. Preferably, the heterophasic propylene copolymer (RAHECO) according to this invention comprises, especially consists of, monomers copolymerizable with propylene from the group consisting of ethylene, 1-butene and 1-hexene. More specifically, the heterophasic propylene copolymer (RAHECO) of this invention comprises—apart from propylene-units derivable from ethylene and/or 1-butene. In a preferred embodiment, the heterophasic propylene copolymer (RAHECO) according to this invention comprises units derivable from ethylene and propylene only. Still more preferably, the random propylene copolymer (R-PP) as well as the elastomeric propylene copolymer (E), i.e. the first elastomeric propylene copolymer fraction (E1) and the second elastomeric propylene copolymer fraction (E2) of the heterophasic propylene copolymer (RAHECO) contain the same comonomers, like ethylene.

Accordingly, the elastomeric propylene copolymer (E) is preferably an ethylene propylene rubber (EPR), whereas the random propylene copolymer (R-PP) is a random ethylene propylene copolymer (R-PP).

The total comonomer content in the heterophasic propylene copolymer (RAHECO) may be moderate, which contributes to the softness of the material. Thus, it is preferred that the comonomer content of the heterophasic propylene copolymer (RAHECO) is in the range from 5.0 to 35.0 mol %, preferably in the range from 11.0 to 28.0 mol %, more preferably in the range from 15.0 to 24.0 mol %.

The xylene cold soluble (XCS) fraction measured according to ISO 16152 (25° C.) of the heterophasic propylene copolymer (RAHECO) may be in the range of 20.0 to 60.0 wt %, preferably in the range from 30.0 to 55.0 wt %, more preferably in the range from 35.0 to 50.0 wt %, still more preferably in the range from 37.0 to 45.0 wt %.

Further, it is appreciated that the xylene cold soluble (XCS) fraction of the heterophasic propylene copolymer (RAHECO) is specified by its intrinsic viscosity. A low intrinsic viscosity (IV) value reflects a low weight average molecular weight. For the present invention, the xylene cold soluble fraction (XCS) of the heterophasic propylene copolymer (RAHECO) may have an intrinsic viscosity (IV) measured according to ISO 1628/1 (at 135° C. in decalin) in the range of 1.0 to 3.0 dl/g, preferably in the range of 1.2 to 2.7 dl/g, more preferably in the range of 1.5 to 2.5 dl/g.

Additionally, it is preferred that the comonomer content of the xylene cold soluble (XCS) fraction of the heterophasic propylene copolymer (RAHECO) is below 45 mol %, preferably in the range of 25 to 42 mol %, more preferably in the range of 30 to 40 mol %, yet more preferably in the range of 32 to 38 mol %. The comonomers present in the xylene cold soluble (XCS) fraction are those defined above for the random propylene copolymer (R-PP) and the elastomeric propylene copolymer (E), respectively. In one preferred embodiment the comonomer is ethylene only.

The heterophasic propylene copolymer (RAHECO) can be further defined by its individual components, i.e. the random propylene copolymer (R-PP) and the elastomeric propylene copolymer (E).

The random propylene copolymer (R-PP) comprises monomers copolymerizable with propylene, for example comonomers such as ethylene and/or $C_4$ to $C_8$ α-olefins. Suitable $C_4$ to $C_8$ α-olefins may be 1-butene and/or 1-hexene. Preferably, the random propylene copolymer (R-PP) according to this invention comprises, especially consists of, monomers copolymerizable with propylene from the group consisting of ethylene, 1-butene and 1-hexene. More specifically, the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

The random propylene copolymer (R-PP) according to this invention has a melt flow rate $MFR_2$ (230° C./2.16 kg) measured according to ISO 1133 in the range of 0.1 to 10.0 g/10 min, more preferably in the range of 1.0 to 4.5 g/10 min, still more preferably in the range of 1.3 to 1.9 g/10 min.

As mentioned above, the heterophasic propylene copolymer (RAHECO) may have a moderate comonomer content. Accordingly, the comonomer content of the random propylene copolymer (R-PP) may be in the range of 2.0 to 15.0 mol %, yet more preferably in the range of 3.8 to 12.0 mol %, still more preferably in the range of 6.5 to 10.0 mol %.

The term "random" indicates that the comonomers of the random propylene copolymer (R-PP) are randomly distributed within the propylene copolymer. The term random is understood according to IUPAC (Glossary of basic terms in polymer science; IUPAC recommendations 1996).

The random propylene copolymer (R-PP) may comprise at least two polymer fractions, like two or three polymer fractions, all of them are propylene copolymers. Even more preferred, the random propylene copolymer (R-PP) may comprise, preferably consist of, a first propylene copolymer fraction (R-PP1) and a second propylene copolymer fraction (R-PP2).

Concerning the comonomers used for the first propylene copolymer fraction (R-PP1) and second propylene copolymer fraction (R-PP2), reference is made to the comonomers of the random propylene copolymer (R-PP). Preferably, the first propylene copolymer fraction (R-PP1) and the second propylene copolymer fraction (R-PP2) contain the same comonomers, such as ethylene.

The heterophasic propylene copolymer (RAHECO) may comprise 60 to 95 wt %, more preferably 60 to 90 wt %, still more preferably 65 to 87 wt % of the random propylene copolymer (R-PP), based on the total weight of the heterophasic propylene copolymer (RAHECO).

The comonomer contents of the random propylene copolymer (R-PP) and the first propylene copolymer fraction (R-PP1) may fulfil inequality (II), more preferably inequality (IIa), still more preferably inequality (IIb), $$\frac{Co(RPP)}{Co(RPP1)} \geq 1.4, \quad\quad (II)$$

$$\frac{Co(RPP)}{Co(RPP1)} \geq 2.5, \quad\quad (IIa)$$

$$\frac{Co(RPP)}{Co(RPP1)} \geq 2.9, \quad\quad (IIb)$$

wherein Co(RPP) is the comonomer content [mol %] of the random propylene copolymer (R-PP) and Co(RPP1) is the comonomer content [mol %] of the first propylene copolymer fraction (R-PP1).

Further, one of the propylene copolymer fractions (R-PP1) and (R-PP2) of the random propylene copolymer (R-PP) is a comonomer lean fraction and the other fraction is the comonomer rich fraction, wherein further the lean fraction and the rich fraction fulfil inequality (III), more preferably inequality (IIIa), still more preferably inequality (IIIb), $$\frac{Co(\text{lean})}{Co(\text{rich})} \leq 0.50, \quad\quad (III)$$

$$0.11 \leq \frac{Co(\text{lean})}{Co(\text{rich})} \leq 0.32, \quad\quad (IIIa)$$

$$0.25 \leq \frac{Co(\text{lean})}{Co(\text{rich})} \leq 0.21, \quad\quad (IIIb)$$

wherein Co (lean) is the comonomer content [mol %] of the random propylene copolymer fraction with the lower comonomer content and Co (rich) is the comonomer content

[mol %] of the random propylene copolymer fraction with the higher comonomer content.

Preferably, the first propylene copolymer fraction (R-PP1) is the random copolymer fraction with the lower comonomer content and the second propylene copolymer fraction (R-PP2) is the random copolymer fraction with the higher comonomer content.

Accordingly, it is preferred that the first propylene copolymer fraction (R-PP1) has a comonomer content in the range of 0.8 to 6.0 mol %, more preferably in the range of 1.5 to 4.0 mol %, still more preferably in the range of 2.2 to 3.0 mol % and/or that the second propylene copolymer fraction has a comonomer content in the range of 7.2 to 20.0 mol %, more preferably in the range of 10.5 to 17.5 mol %, still more preferably in the range of 12.0 to 15.5 mol %, based on the overall amount of fractions (R-PP1) and (R-PP2), respectively.

In addition or alternatively to inequality (III), one of the propylene copolymer fractions (R-PP1) and (R-PP2) of the random propylene copolymer (R-PP) may be a low melt flow rate $MFR_2$ (230° C./2.16 kg) fraction and the other fraction may be a high melt flow rate $MFR_2$ (230° C./2.16 kg) fraction, wherein further the low MFR fraction and the high MFR fraction fulfil inequality (IV), more preferably inequality (IVa), still more preferably inequality (IVb), $$\frac{MFR(\text{high})}{MFR(\text{low})} \geq 2.0, \qquad (IV)$$

$$8.0 \geq \frac{MFR(\text{high})}{MFR(\text{low})} \geq 2.5, \qquad (IVa)$$

$$5.0 \geq \frac{MFR(\text{high})}{MFR(\text{low})} \geq 3.5, \qquad (IVb)$$

wherein MFR (high) is the melt flow rate $MFR_2$ (230° C./2.16 kg) [g/10 min] of the random propylene copolymer fraction with the higher melt flow rate $MFR_2$ (230° C./2.16 kg) and MFR (low) is the melt flow rate $MFR_2$ (230° C./2.16 kg) [g/10 min] of the random propylene copolymer fraction with the lower melt flow rate $MFR_2$ (230° C./2.16 kg).

Preferably, the first propylene copolymer fraction (R-PP1) is the random copolymer fraction with the higher melt flow rate $MFR_2$ (230° C./2.16 kg) and the second propylene copolymer fraction (R-PP2) is the random copolymer fraction with the lower melt flow rate $MFR_2$ (230° C./2.16 kg).

Further, the weight ratio between the first propylene copolymer fraction (R-PP1) and second propylene copolymer fraction (R-PP2) may be 10:90 to 90:10, more preferably 15:85 to 85:15, still more preferably 20:80 to 80:20.

Additionally, the heterophasic propylene copolymer (RAHECO) preferably comprises 5 to 40 wt %, more preferably 10 to 40 wt %, still more preferably 13 to 35 wt % of the elastomeric propylene copolymer (E), based on the total weight of the heterophasic propylene copolymer (RAHECO).

Thus, it is appreciated that the heterophasic propylene copolymer (RAHECO) preferably comprises, more preferably consists of, 60 to 95 wt %, preferably 60 to 90 wt %, more preferably 65.0 to 87.0 wt % of the random propylene copolymer (R-PP) and 5 to 40 wt %, preferably 10 to 40 wt %, more preferably 13.0 to 35.0 wt % of the elastomeric propylene copolymer (E), based on the total weight of the heterophasic propylene copolymer (RAHECO).

The elastomeric propylene copolymer (E) comprises monomers copolymerizable with propylene, for example comonomers such as ethylene and/or $C_4$ to $C_8$ α-olefins. Suitable $C_4$ to $C_8$ α-olefins may be 1-butene and/or 1-hexene. Preferably, the elastomeric propylene copolymer (E) comprises, especially consists of, monomers copolymerizable with propylene from the group consisting of ethylene, 1-butene and 1-hexene. More specifically, the elastomeric propylene copolymer (E) comprises—apart from propylene—units derivable from ethylene and/or 1-butene. Thus, in an especially preferred embodiment the elastomeric propylene copolymer (E) comprises units derivable from ethylene and propylene only.

The comonomer content of the elastomeric propylene copolymer (E) preferably is in the range of 30.0 to 65.0 mol %, more preferably in the range of 40.0 to 55.0 mol %, still more preferably in the range of 48.0 to 51.0 mol %.

The elastomeric propylene copolymer (E) may comprise a first elastomeric propylene copolymer fraction (E1) and a second elastomeric propylene copolymer fraction (E2).

The heterophasic propylene copolymer (RAHECO) as defined in the instant invention may further comprise up to 5.0 wt % additives, like nucleating agents and antioxidants, as well as slip agents and antiblocking agents. Preferably, the additive content (without α-nucleating agents) is below 3.0 wt %, more preferably below 1.0 wt %.

The heterophasic propylene copolymer (RAHECO) as defined in the instant invention may be visbroken. The visbroken heterophasic propylene copolymer (RAHECO) preferably has a higher melt flow rate than the non-visbroken heterophasic propylene copolymer (RAHECO). The heterophasic propylene copolymer (RAHECO) may be visbroken with a visbreaking ratio (VR) as defined by equation (V)

$$1.1 \leq \frac{MFR(\text{final}) - MFR(\text{intial})}{MFR(\text{initial})} \leq 10.0 \qquad (V)$$

wherein "MFR(final)" is the $MFR_2$ (230° C./2.16 kg) of the heterophasic propylene copolymer (RAHECO) after visbreaking and "MFR(initial)" is the $MFR_2$ (230° C./2.16 kg) of the heterophasic propylene copolymer (RAHECO) before visbreaking.

Preferred mixing devices suited for visbreaking are discontinuous and continuous kneaders, twin screw extruders and single screw extruders with special mixing sections and cokneaders.

By visbreaking the heterophasic propylene copolymer (RAHECO) with heat or at more controlled conditions with peroxides, the molar mass distribution (MWD) becomes narrower because the long molecular chains are more easily broken up or scissored and the molar mass M, will decrease, corresponding to an $MFR_2$ increase. The $MFR^2$ increases with increase in the amount of peroxide which is used.

Such visbreaking may be carried out in any known manner, like by using a peroxide visbreaking agent. Typical visbreaking agents are 2,5-dimethyl-2,5-bis(tert.-butyl-peroxy)hexane (DHBP) (for instance sold under the tradenames Luperox 101 and Trigonox 101), 2,5-dimethyl-2,5-bis(tert.-butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.-butyl-peroxide (DTBP) (for instance sold under the tradenames Trigonox B and Luperox Di), tert.-butyl-cumyl-peroxide (BCUP) (for instance sold under the tradenames Trigonox T and Luperox 801) and bis (tert.-butylperoxy-isopropyl)benzene (DIPP)

(for instance sold under the tradenames Perkadox 14S and Luperox DC). Suitable amounts of peroxide to be employed are in principle known to the skilled person and can easily be calculated on the basis of the amount of heterophasic propylene copolymer (RAHECO) to be subjected to visbreaking, the MFR$_2$ (230° C./2.16 kg) value of the heterophasic propylene copolymer (RAHECO) to be subjected to visbreaking and the desired target MFR$_2$ (230° C./2.16 kg) of the product to be obtained. Accordingly, typical amounts of peroxide visbreaking agent are from 0.005 to 0.7 wt.-%, more preferably from 0.01 to 0.4 wt.-%, based on the total amount of heterophasic propylene copolymer (RAHECO) employed. Typically, visbreaking is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate. The heterophasic propylene copolymer (RAHECO) of the present invention may be obtained by visbreaking the heterophasic propylene copolymer (RAHECO), preferably visbreaking by the use of peroxide. More precisely, the heterophasic propylene copolymer (RAHECO) of the invention may be obtained by visbreaking the heterophasic propylene copolymer (RAHECO), preferably by the use of peroxide as mentioned above, in an extruder. After visbreaking, the heterophasic propylene copolymer (RAHECO) may preferably be in the form of pellets or granules.

The heterophasic propylene copolymer (RAHECO) may be produced in a multistage process comprising at least two reactors connected in series, wherein the heterophasic propylene copolymer (RAHECO) comprises a matrix (M) being a random propylene copolymer (PP) and an elastomeric propylene copolymer (E) dispersed in the matrix (M).

The heterophasic propylene copolymer (RAHECO) may be obtained by a sequential polymerization process comprising the steps of
a) polymerizing in a first reactor (R1) propylene and ethylene and/or a C$_4$ to C$_8$ α-olefin, obtaining a first random propylene copolymer fraction (R-PP1),
b) transferring the first random propylene copolymer fraction (R-PP1) into a second reactor (R2),
c) polymerizing propylene and ethylene and/or a C$_4$ to C$_8$ α-olefin in the second reactor (R2) in the presence of the first random propylene copolymer fraction (R-PP1), obtaining a second random copolymer fraction (R-PP2), the first random propylene copolymer fraction (R-PP1) and the second random copolymer fraction (R-PP2) forming the random propylene copolymer (R-PP),
d) transferring the random propylene copolymer (R-PP) into a third reactor (R3),
e) polymerizing propylene and ethylene and/or a C$_4$ to C$_8$ α-olefin in the third reactor (R3) in the presence of the random propylene copolymer (R-PP), obtaining a third polymer fraction being the elastomeric copolymer (E), the propylene copolymer (R-PP) and the elastomeric propylene copolymer (E) forming the heterophasic propylene copolymer (RAHECO).

For preferred embodiments of the random heterophasic propylene copolymer (RAHECO), the random propylene copolymer (R-PP), the first propylene copolymer fraction (R-PP1), the second propylene copolymer fraction (R-PP2) and the elastomeric copolymer (E), reference is made to the definitions given above.

The term "sequential polymerization process" indicates that the random heterophasic propylene copolymer (RA-HECO) is produced in at least two, preferably three, reactors connected in series. Accordingly, the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor may be a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor.

The second reactor and the third reactor may be gas phase reactors. Such gas phase reactors can be any mechanically mixed or fluid bed reactors. Preferably, the gas phase reactors comprise a mechanically agitated fluid bed reactor with gas velocities of at least 0.2 m/sec. Thus, it is appreciated that the gas phase reactor is a fluidized bed type reactor preferably with a mechanical stirrer.

Thus, in a preferred embodiment the first reactor R1 is a slurry reactor, e.g. loop reactor, whereas the second reactor R2 and the third reactor R3 are gas phase reactors (GPR). Further, a pre-polymerization reactor may be placed upstream from the first reactor R1.

A preferred multistage process is a "loop-gas phase"-process, such as developed by Borealis A/S, Denmark (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (RAHECO) as defined above, the conditions for the first reactor R1 may be as follows:
the temperature is within the range of 50° C. to 110° C., preferably between 60° C. and 100° C., more preferably between 65 and 95° C.,
the pressure is within the range of 20 bar to 80 bar, preferably between 40 bar to 70 bar,
hydrogen can be added for controlling the molar mass in a manner known per se.

Subsequently, the reaction mixture of the first reactor R1 is transferred to the second reactor R2, where the conditions may be as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The conditions in the third reactor R3 may be similar to the conditions in the second reactor R2.

The residence time can vary in the three reactor zones.

Thus, the residence time in first reactor R1 may be in the range 0.1 to 2.5 hours, preferably 0.15 to 1.5 hours and the residence time in each of the second and the third reactor R2 and R3 may be 0.2 to 6.0 hours, preferably 0.5 to 4.0 hours.

If desired, the polymerization may be effected in a known manner under supercritical conditions in the first reactor R1, and/or as a condensed mode in the second and the third reactor R2 and R3.

Preferably, the process comprises also a pre-polymerization with the catalyst system, as described in detail below, comprising a Ziegler-Natta procatalyst, an external donor and optionally a cocatalyst.

In a preferred embodiment, the pre-polymerization is conducted as bulk slurry polymerization in liquid propylene, i.e. the liquid phase mainly comprises propylene, with minor amount of other reactants and optionally inert components dissolved therein.

The pre-polymerization reaction is typically conducted at a temperature of 10 to 60° C., preferably from 15 to 50° C., and more preferably from 18 to 45° C.

The pressure in the pre-polymerization reactor is not critical but must be sufficiently high to maintain the reaction mixture in liquid phase. Thus, the pressure may be from 20 to 100 bar, for example 30 to 70 bar.

The catalyst components are preferably all introduced to the pre-polymerization step. However, where the solid catalyst component (i) and the cocatalyst (ii) can be fed separately it is possible that only a part of the cocatalyst is introduced into the pre-polymerization stage and the remaining part into subsequent polymerization stages. Also in such cases it is necessary to introduce so much cocatalyst into the pre-polymerization stage that a sufficient polymerization reaction is obtained therein.

It is possible to add other components also to the pre-polymerization stage. Thus, hydrogen may be added into the pre-polymerization stage to control the molecular weight of the prepolymer as is known in the art. Further, antistatic additive may be used to prevent the particles from adhering to each other or to the walls of the reactor.

The precise control of the pre-polymerization conditions and reaction parameters is within the skill of the art.

According to the invention, the heterophasic propylene copolymer (RAHECO) is obtained by a multistage polymerization process, as described above, in the presence of a catalyst system.

As pointed out above, in the specific process for the preparation of the heterophasic propylene copolymer (RAHECO) as defined above, a specific Ziegler-Natta catalyst (ZN-C) must be used.

Accordingly, the Ziegler-Natta catalyst (ZN-C) will be now described in more detail.

The heterophasic propylene copolymer (RAHECO) applied according to this invention is preferably produced in the presence of
(a) a Ziegler-Natta catalyst (ZN-C) comprising compounds (TC) of a transition metal of Group 4 to 6 of IUPAC, a Group 2 metal compound (MC) and an internal donor (ID);
(b) optionally a co-catalyst (Co), and
(c) optionally an external donor (ED).

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, i.e. the catalyst is selfsupported.

The Ziegler-Natta catalyst (ZN-C) can be further defined by the way as obtained. Accordingly, the Ziegler-Natta catalyst (ZN-C) is preferably obtained by a process comprising the steps of
a)
$a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;
or
$a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;
or
$a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and
b) adding the solution from step a) to at least one compound (TC) of a transition metal of Group 4 to 6 and
c) obtaining the solid catalyst component particles,
and adding a non-phthalic internal electron donor (ID) at any step prior to step c).

The internal donor (ID) or precursor thereof is added preferably to the solution of step a).

According to the procedure above, the Ziegler-Natta catalyst (ZN-C) can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion, the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably, the Group 2 metal (MC) is magnesium.

The magnesium alkoxy compounds (Ax), (Ax') and (Bx) can be prepared in situ in the first step of the catalyst preparation process, step a), by reacting a magnesium compound with the alcohol(s) as described above. Alternatively, the magnesium alkoxy compounds can be separately prepared magnesium alkoxy compounds or they can even be commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably, a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably, the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain the magnesium alkoxide compounds. Preferred polyhydric alcohols, if used, are alcohols, wherein R" is a straight-chain, cyclic or branched $C_2$ to $C_{10}$ hydrocarbon group, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition, a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particularly preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium comound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particularly preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100 μm. Particles are compact with low porosity and have surface area below 20 $g/m^2$, more preferably below 10 $g/m^2$. Typically, the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C) is preferably used in association with an alkyl aluminum cocatalyst and optionally external donors.

The catalyst system which is used according to the present invention also comprises an aluminium alkyl compound, preferably of the general formula $AlR_{3-n}X_n$ wherein R is straight chain or branched alkyl group having 1 to 20, preferably 1 to 10 and more preferably 1 to 6 carbon atoms, X is halogen and n is 0, 1, 2 or 3, which aluminium alkyl compound is added, and brought into contact with the droplets of the dispersed phase of the agitated emulsion before recovering the solidified particles of the catalyst.

It is further preferred that at least a part of the aluminium compound is added, in pure form or in the form of a solution, from shortly before the beginning of the emulsion formation until adding it to the washing liquid, e.g. toluene, in such an amount that the final Al content of the particles is from 0.05 to 1 wt %, preferably 0.1 to 0.8 wt % and most preferably 0.2 to 0.7 wt % by weight of the final catalyst particles. The most preferred Al content may vary depending upon the type of the Al compound and on the adding step. For example, in some cases the most preferred amount may be 0.1 to 0.4 wt %.

Still further, preferably tri-($C_1$-$C_6$)-alkyl aluminium compounds are used, triethylaluminium being most preferred.

In Ziegler-Natta catalysts alumimium alkyl compounds are used as cocatalysts, i.e. for activating the catalyst. During activation of polypropylene catalysts, not only does the alkyl aluminium reduce and alkylate the active metal, but it has also influence on the donor composition. It is well-known that alkyl aluminium compounds can remove carboxylic acid esters, which are used as internal donors.

In the catalysts used in the present invention, the internal donor, preferably substituted maleates and citraconates, can be significantly extracted from the catalyst by means of the alkyl aluminium compound.

The extraction level is dependent on the concentration of the aluminium alkyl. The higher the concentration, the more of the internal donor can be extracted. Further, the addition of the external donor together with aluminium alkyl improves the donor exchange. The longer the reaction time is, the more external donor is bound on the catalyst.

As a further component in the instant polymerization process, an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

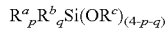

$$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si($OCH_3$)$_2$, (cyclohexyl)(methyl)Si($OCH_3$)$_2$, (phenyl)$_2$Si($OCH_3$)$_2$ and (cyclopentyl)$_2$Si($OCH_3$)$_2$, or of general formula Si($OCH_2CH_3$)$_3$(NR$^3$R$^4$), wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably, both $R^3$ and $R^4$ are the same, yet more preferably both $R^3$ and $R^4$ are an ethyl group.

Especially preferred external donors (ED) are the cyclohexylmethyl dimethoxy silane donor (C-Donor) or the pentyl dimethoxy silane donor (D-donor), the latter especially preferred.

It is preferred that a solution containing alkyl aluminium and external donor in an organic solvent, e.g. pentane, are added to the catalyst after solidification of the catalyst particles.

Typically, tri-ethyl aluminium (TEN) is used as cocatalyst and silanes as external donors as is disclosed e.g. in articles Sacci, M. C; Forlini, F.; Tritto, I and Locatelli, P., Macromolecules, 1996, 29, 3341-3345 and Sacci, M. C; Tritto, I.; Shan, C. and Mendichi, R., Macromolecules, 1991, 24, 6823-6826.

As mentioned above, the catalyst which is obtained by the above described process is a non-supported Ziegler-Natta catalyst. Non-supported catalysts do not use any external carrier, contrary to conventional catalysts, e.g. conventional Ziegler-Natta catalysts, which are e.g. supported on silica or $MgCl_2$.

Further preferred embodiments of the catalyst system production include all preferred embodiments as described in WO 2014/187686 A1 and WO 2016/066446 A1.

The random heterophasic polypropylene copolymer has $MFR_2$ (230° C.) in the range of 0.5 to 15.0 g/10 min, preferably in the range of 1.0 to 10.0 g/10 min, even more preferably in the range of 2.0 to 8.0 g/10 min.

Further, the random heterophasic polypropylene copolymer has Charpy impact strength at −20° C. in the range of 5 to 20 kJ/$m^2$, preferably, 8 to 15 kJ/$m^2$.

The random heterophasic polypropylene copolymer may have Charpy impact strength measured at 0° C. in the range of 40 to 90 kJ/$m^2$, preferably 50 to 80 kJ/$m^2$; and/or Charpy impact strength at 23° C. in the range of 40 to 90 kJ/$m^2$, preferably 50 to 80 kJ/$m^2$.

The random heterophasic polypropylene copolymer may have a melting temperature in the range of 130 to 160° C., preferably 140 to 155° C. The higher melting point means that solid state mechanical properties are maintained at temperatures of 130° C. and above where the polyethylene materials are melted.

The random heterophasic polypropylene copolymer may have a flexural modulus below 400 MPa, and preferably above 200 MPa, even more preferably the flexural modulus is in the range of 200 to 380 MPa.

The random heterophasic polypropylene copolymer may have Shore D (1 s) and/or (3 s), which is a measure of the softness of the material in the range of 35 to 50.

The random heterophasic polypropylene copolymer may constitute at least 95 wt %, preferably at least 97 wt %, of the cable jacket.

The cable jacket may be a power cable jacket, even more preferably an outer power cable jacket.

The cable jacket may further comprise a UV stabilizer in an amount of up to 5 wt %, preferably up to 3 wt % of the entire jacket. The UV stabilizer may for instance be carbon black. Small amounts of other additives, such as antioxidants may be present in an amount from 0.01 to 1 wt %.

The present invention further pertains to a cable comprising the cable jacket as describe in any of the above embodiments. Preferably, the cable is a power cable, amongst them high-voltage cables, medium-voltage cables and low-voltage cables.

The present invention further pertains to the use of the cable jacket as describe in any of the above embodiments for lowering the amount of copper needed in a copper concentric neutral of a power cable.

DETAILED DESCRIPTION OF THE INVENTION

Measurements Methods

Melting Point

The melting point was determined with differential scanning calorimetry according to ISO11357-3.

Charpy Impact Strength

Charpy impact strength was measured at −20° C., 0° C. and 23° C. according to ISO 179-1/1eA. The test specimens were made from 4 mm thick plaques prepared by compression moulding at 200° C. with cooling rate 15° C./min. The notches were of type A (V-notch) with radius 0.25±0.05 mm. The pendulum energies used were 0.5, 1, 2, and 4 J. Different pendulums were used because according to ISO 179-1/1eA, the absorbed energy at impact needs to be between 10 and 80% of the impact energy. 10 specimens were tested for each test condition and the reported values are the average from 10 measurements. The type of failure is also reported. According to ISO 179-1/1eA, four different types of failure can occur:

C complete break: a break in which the specimen separates into two or more pieces;

H hinge break: an incomplete break such that both parts of the specimen are held together only by a thin peripheral layer in the form of a hinge having low residual stiffness;

P partial break: an incomplete break that does not meet the definition for hinge break;

N non-break: there is no break, and the specimen is only distorted, possibly combined with stress whitening.

MFR

The melt flow rate MFR was measured in accordance with ISO 1133. The polyethylene examples have been analysed at 190° C. with a load of 2.16 kg and the polypropylene samples at 230° C. and 2.16 kg load.

Shore D

Shore D hardness was tested on a durometer hardness tester Bareiss HPE II. Samples for testing were prepared from 2 mm thick plaques produced by compression moulding at 180° C. for the comparative examples CE1 and CE2 and at 230° C. for the inventive example IE1. Cooling rate was 15° C./min. After compression moulding, the plaques were conditioned for at least one hour at room temperature before the metal frames were removed.

The Shore D hardness after 3 seconds was determined according to ISO 7619-1, and the Shore D hardness after 1 second were determined according to ISO 868, with the deviation that the median value is reported. The reported values are median values from five measurements.

Flexural Modulus

Flexural modulus was determined according to ISO 178, which describes the procedure for a 3 point bending test. For the inventive example IE1, injection moulded specimens were used, produced according to ISO 1873-2. The test specimens for the comparative examples CE1 and CE2 were prepared by die cutting from 4 mm thick compression moulded plaques prepared according to ISO 1872-2.

XCS

Xylene cold soluble fraction was measured according to according to ISO 16152 (25° C.), first edition; 2005 Jul. 1.

Poly(Propylene-Co-Ethylene)-Ethylene Content—$^{13}$C NMR Spectroscopy

Quantitative $^{13}$C{$^{1}$H} NMR spectra were recorded in the solution-state using a Bruker Avance III 400 NMR spectrometer operating at 400.15 and 100.62 MHz for $^{1}$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d2 (TCE-d2) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}$C{$^{1}$H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E). The comonomer fraction was quantified using the method of Wang et. al. (Wang, W.-J., Zhu, S., Macromolecules 33 (2000), 1157) through integration of multiple signals across the whole spectral region in the $^{13}$C{$^{1}$H} spectra. This method was chosen for its robust nature and ability to account for the presence of regio-defects when needed. Integral regions were slightly adjusted to increase applicability across the whole range of encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to E=0.5(Sββ+Sβγ+Sβδ+0.5 (Sαβ+Sαγ)). Through the use of this set of sites the corresponding integral equation becomes E=0.5(I$_H$+I$_G$+0.5(I$_C$+I$_D$)) using the same notation used in the article of Wang et. al. (Wang, W.-J., Zhu, S., Macromolecules 33 (2000), 1157). Equations used for absolute propylene content were not modified. The mole percent comonomer incorporation was calculated from the mole fraction: E [mol %]=100*fE. The weight percent comonomer incorporation was calculated from the mole fraction: E [wt %]=100*(fE*28.06)/((fE*28.06)+((1−fE)*42.08)).

Examples

Materials

PP is soft random heterophasic propylene copolymer having MFR$_2$ (230° C./2.16 kg) of 3.8 g/10 min, measured according to ISO 1133, Flexural Modulus of 327 MPa, measured on injection moulded specimens, conditioned at 23° C. and 50% relative humidity according to ISO 178, and melting temperature (DSC) of 149° C., measured according to ISO 11357-3.

PP was produced as follows:

Preparation of the Catalyst

The catalyst used in the polymerization processes for PP was prepared as follows:

Used Chemicals:

20% solution in toluene of butyl ethyl magnesium (Mg(Bu)(Et), BEM), provided by Chemtura; 2-ethylhexanol, provided by Amphochem; 3-Butoxy-2-propanol—(DOWANOL™ PnB), provided by Dow; bis(2-ethylhexyl)citraconate, provided by SynphaBase; TiCl$_4$, provided by Millenium Chemicals; Toluene, provided by Aspokem; Viscoplex® 1-254, provided by Evonik; and Heptane, provided by Chevron.

Preparation of a Mg Alkoxy Compound

Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature, 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the Mg alkoxy compound prepared as described above was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature. The thus obtained catalyst was used along with triethyl-aluminium (TEAL) as co-catalyst and dicyclopentyl dimethoxy silane (D-Donor) as donor.

Polymerization of RAHECO

TABLE 1

| C2 ethylene | | |
|---|---|---|
| Prepolymerization | | RAHECO |
| TEAL/Ti | [mol/mol] | 201 |
| TEAL/donor | [mol/mol] | 7.90 |
| Temperature | [° C.] | 30 |
| res.time | [h] | 0.33 |
| Loop | | |
| Temperature | [° C.] | 70 |
| Pressure | [kPa] | 5500 |
| Split | [%] | 30.8 |
| H2/C3 ratio | [mol/kmol] | 1.15 |
| C2/C3 ratio | [mol/kmol] | 3.77 |
| MFR2 | [g/10 min] | 6.0 |
| XCS | [wt.-%] | 5.3 |
| C2 content | [mol-%] | 3.0 |
| GPR 1 | | |
| Temperature | [° C.] | 80 |
| Pressure | [kPa] | 2700 |
| Split | [%] | 46.2 |
| H2/C3 ratio | [mol/kmol] | 2.6 |
| C2/C3 ratio | [mol/kmol] | 46.7 |
| MFR 2 | [g/10 min] | 2.2 |
| XCS | [wt.-%] | 17.9 |
| C2 content | [mol-%] | 8.7 |
| GPR 2 | | |
| Temperature | [° C.] | 71 |
| Pressure | [kPa] | 2600 |
| Split | [%] | 23.0 |
| C2/C3 ratio | [mol/kmol] | 252 |
| H2/C2 ratio | [mol/kmol] | 84 |
| MFR2 | [g/10 min] | 1.2 |
| XCS | [wt.-%] | 39.0 |

TABLE 1-continued

| C2 ethylene | | |
|---|---|---|
| Prepolymerization | | RAHECO |
| IV (XCS) | [dl/g] | 2.2 |
| C2 (XCS) | [mol-%] | 34.5 |
| C2 content | [mol-%] | 20.9 |

H2/C3 ratio hydrogen/propylene ratio
C2/C3 ratio ethylene/propylene ratio
H2/C2 ratio hydrogen/ethylene ratio
GPR 1/2 $1^{st}/2^{nd}$ gas phase reactor
Loop loop reactor The RAHECO was visbroken in a twin-screw extruder using an appropriate amount of (tert.-butylperoxy)-2,5-dimethylhexane (Trigonox 101, distributed by Akzo Nobel, Netherlands) to achieve a $MFR_2$ of 3.8 g/10 min. The product PP was stabilized with 0.2 wt.-% of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany) and 0.1 wt.-% calcium stearate.

PE1 is a bimodal LLDPE having density of 923 kg/m³ (ISO 1872-2/ISO 1183) and MFR2 (190° C./2.16 kg) of 0.85 g/10 min (ISO 1133).

PE2 is a bimodal HDPE having density of 946 kg/m3 (ISO 1872-2/ISO 1183) and $MFR_2$ (190° C./2.16 kg) of 0.5 g/10 min (ISO 1133).

All the materials are commercially available from Borealis AG. The grades used in the comparative examples are bimodal polyethylene grades designed for cable jacketing applications.

Table 2 provides an overview of relevant jacketing properties for the comparative examples CE1, CE2 and the inventive example IE1.

From the Table, a large difference in melting point between PP on one hand and PE1 and PE2 on the other hand becomes apparent. The melting point of PP is 21° C. higher than that of PE2 and 25° C. higher than that of PE1. The higher melting point means maintained solid state mechanical properties at temperatures of 130° C. and above where the polyethylene materials are melted.

Further, the examples in Table 2 show that the impact strength of the material of the inventive example IE1 is higher compared to the material of CE2, and at similar level compared to the material of CE1. Standard polypropylene materials have the disadvantage of low impact strength at temperatures below 0° C., and are therefore normally not considered for cable jacketing applications. The impact strength of the material in IE1, however, shows similar temperature dependence as the material used in CE1.

TABLE 2

| Material | CE1 PE1 | CE2 PE2 | IE1 PP |
|---|---|---|---|
| Melting point (° C.) | 124 | 128 | 149 |
| $MFR_2$ 2.16 kg, 190° C. (g/10 min) | 0.85 | 0.5 | — |
| $MFR_2$ 2.16 kg, 230° C. (g/10 min) | — | — | 3.8 |
| Flexural modulus (MPa) | 400[1] | 1000[1] | 327 |
| Shore D 1s; 3s | 54; 53 | 63; 61 | 49; 44 |
| Charpy impact strength 23° C. (kJ/m²) | 75.9 (P) | 8.9(H) | 69.1 (P) |
| Charpy impact strength 0° C. (kJ/m²) | 87.1 (P) | 4.7(C) | 68.6 (P) |
| Charpy impact strength −20° C. (kJ/m²) | 10.8 (C) | 3.5(C) | 10.2(C) |

[1]Obtained from product data sheets

Although the present invention has been described with reference to various embodiments, those skilled in the art will recognize that changes may be made without departing from the scope of the invention. It is intended that the detailed description be regarded as illustrative, and that the appended claims including all the equivalents are intended to define the scope of the invention.

The invention claimed is:

1. A cable jacket comprising a random heterophasic polypropylene copolymer, the random heterophasic polypropylene copolymer comprising a matrix (M) being a random propylene copolymer (R-PP) and dispersed therein an elastomeric propylene copolymer (E),
    wherein the random propylene copolymer (R-PP) comprises a first propylene copolymer fraction (R-PP1) having a comonomer content in the range of 0.8 to 6.0 mol % and a second propylene copolymer fraction (R-PP2) having a comonomer content in the range of 7.2 to 20.0 mol %, based on the overall amount of fractions (R-PP1) and (R-PP2), and
    wherein said random heterophasic polypropylene copolymer has $MFR_2$ (230° C.) measured according to ISO 1133 in the range of 0.5 to 15 g/10 min, and Charpy impact strength measured according to ISO 179-1/1eA at −20° C. in the range of 5 to 20 $kJ/m^2$.

2. The cable jacket according to claim 1, wherein said random heterophasic polypropylene copolymer has Charpy impact strength measured according to ISO 179-1/1eA at −20° C. in the range of 8 to 15 $kJ/m^2$.

3. The cable jacket according to claim 1, wherein said random heterophasic polypropylene copolymer has Charpy impact strength measured according to ISO 179-1/1eA at 0° C. in the range of 40 to 90 $kJ/m^2$.

4. The cable jacket according to claim 1, wherein said random heterophasic polypropylene copolymer has Charpy impact strength measured according to ISO 179-1/1eA at 23° C. in the range of 40 to 90 $kJ/m^2$.

5. The cable jacket according to claim 1, wherein said random heterophasic polypropylene copolymer has a flexural modulus measured according to ISO178 below 400 MPa.

6. The cable jacket according to claim 1, wherein said random heterophasic polypropylene copolymer has a flexural modulus measured according to ISO178 above 200 MPa.

7. The cable jacket according to claim 1, wherein said random heterophasic polypropylene copolymer has $MFR_2$ (230° C.) measured according to ISO 1133 in the range of 1 to 10 g/10 min.

8. The cable jacket according to claim 1, wherein said random heterophasic polypropylene copolymer constitutes at least 95 wt % of said cable jacket.

9. The cable jacket according to claim 1, wherein said cable jacket is a power cable jacket.

10. A cable comprising the cable jacket according to claim 1.

11. The cable according to claim 10, wherein said cable is a power cable.

12. The cable jacket according to claim 1, wherein said random heterophasic polypropylene copolymer has Charpy impact strength measured according to ISO 179-1/1eA at 0° C. in the range of 50 to 80 $kJ/m^2$.

13. The cable jacket according to claim 1, wherein said random heterophasic polypropylene copolymer has Charpy impact strength measured according to ISO 179-1/1eA at 23° C. in the range of 50 to 80 $kJ/m^2$.

14. The cable jacket according to claim 1, wherein said random heterophasic polypropylene copolymer has $MFR_2$ (230° C.) measured according to ISO 1133 in the range of 2 to 8 g/10 min.

15. The cable jacket according to claim 1, wherein said random heterophasic polypropylene copolymer constitutes at least 97 wt % of said cable jacket.

* * * * *